(12) United States Patent
Gieras et al.

(10) Patent No.: US 8,201,774 B2
(45) Date of Patent: Jun. 19, 2012

(54) ELECTROMAGNETIC LANDING GEAR BRAKES

(75) Inventors: Jacek F. Gieras, Glastonbury, CT (US); Gregory I. Rozman, Rockford, IL (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 486 days.

(21) Appl. No.: 12/560,457

(22) Filed: Sep. 16, 2009

(65) Prior Publication Data

US 2011/0062280 A1 Mar. 17, 2011

(51) Int. Cl.
*B64C 25/42* (2006.01)
(52) U.S. Cl. ............... 244/111; 244/110 A; 188/161
(58) Field of Classification Search ............... 244/111, 244/110 A, 103 S; 188/161, 71.5
See application file for complete search history.

(56) References Cited

U.S. PATENT DOCUMENTS

| | | | |
|---|---|---|---|
| 4,542,809 A * | 9/1985 | Crossman | 188/72.8 |
| 6,148,967 A * | 11/2000 | Huynh | 188/164 |
| 6,260,667 B1 | 7/2001 | Sugden | |
| 6,758,440 B1 * | 7/2004 | Repp et al. | 244/110 R |
| 6,918,470 B2 * | 7/2005 | Guaraldo | 188/171 |
| 7,410,344 B2 | 8/2008 | Seidel et al. | |
| 7,429,855 B2 | 9/2008 | Rozman | |
| 7,567,047 B2 | 7/2009 | Rozman | |
| 2003/0189380 A1 * | 10/2003 | Ishikawa et al. | 310/77 |
| 2004/0154880 A1 * | 8/2004 | Guaraldo | 188/71.5 |
| 2005/0109568 A1 | 5/2005 | Ether | |
| 2005/0178115 A1 | 8/2005 | Hughey | |
| 2005/0181246 A1 | 8/2005 | Nakaji | |
| 2005/0189894 A1 | 9/2005 | Komiyama et al. | |
| 2005/0258790 A1 | 11/2005 | Takeuchi | |
| 2006/0028178 A1 | 2/2006 | Hobbs | |
| 2010/0101901 A1 * | 4/2010 | Gay | 188/161 |

* cited by examiner

*Primary Examiner* — Christopher P Ellis
(74) *Attorney, Agent, or Firm* — Carlson, Gaskey & Olds, PC

(57) ABSTRACT

An electromagnetic control for the landing gear of an aircraft includes a hub to be fixed to a frame of an aircraft landing gear. A rotor rotates with a tire on the aircraft landing gear. Permanent magnetic disks are associated with the rotor, and interspersed with disks on the hub. Some of the disks on the hub are electromagnetic disks supplied with electric power, and some of the plurality of disks on the hub are made of high electric conductivity material.

10 Claims, 1 Drawing Sheet

ELECTROMAGNETIC LANDING GEAR BRAKES

BACKGROUND OF THE INVENTION

This application relates to a landing gear for an aircraft wherein braking is provided with both electric motor/generator and eddy currents induced by rotating permanent magnets and high electric conductivity stationary disks.

Aircraft are typically provided with landing gear which include wheels that touch the ground and roll as the aircraft begins to slow and eventually stop. In the past, systems have been proposed that include permanent magnet disks associated to rotate with the wheel, and electromagnetic disks provided with a stator hub and fixed adjacent to the disks on the wheel. Electromagnetic disks contain polyphase or single phase coils.

A control system controls the electromagnetic disks, and is able to provide drive for the wheel such that the wheel can move up to the speed of the aircraft just before touchdown to reduce friction. The electromagnetic disk-permanent magnet system operates as a motor. After touchdown, the electromagnetic disk-permanent magnet system operates as a generator producing a retarding force, such that it assists in braking the wheel, and is utilized in conjunction with mechanical brakes. The electric energy produced upon landing can be regenerated/stored for later use by the aircraft power system or dissipated through a resistor.

Such systems are disclosed in prior U.S. Pat. Nos. 7,226,018, and 7,237,748, the description of which is incorporated by reference here.

SUMMARY OF THE INVENTION

An electromagnetic control for the landing gear of an aircraft includes a hub to be fixed to a frame of an aircraft landing gear. A rotor rotates with a tire on the aircraft landing gear. Permanent magnetic disks are associated with the rotor, and interspersed with disks on the hub. Some of the disks on the hub are electromagnetic disks with electric coils, and some of the plurality of disks on the hub are made of high conductivity metal, alloy or composite material.

These and other features of the present invention can be best understood from the following specification and drawings, the following of which is a brief description.

DETAILED DESCRIPTION OF THE PREFERRED EMBODIMENT

As is described in U.S. Pat. Nos. 7,226,018 and 7,237,748, landing gear for aircraft may be provided with electromagnetic disks mounted on a fixed hub for a wheel. The wheel is provided with permanent magnet disks that are driven with the wheel to rotate adjacent to the electromagnetic disks. A control is operable to selectively control a power supply to the electromagnetic disks (motor operation) such that the wheel can be driven to rotate, as when the aircraft first touches ground. In this manner, the wheel can be brought up to approximate the speed of the aircraft just prior to touchdown such that the friction on the wheel is reduced.

After touchdown, the electromagnetic disk-permanent magnet system operates as a generator. The electromagnetic force is reversed such that the interaction between the electromagnetic disks on the hub and the permanent magnet disks on the wheel combine to retard rotation and assist in braking.

Figure 1:
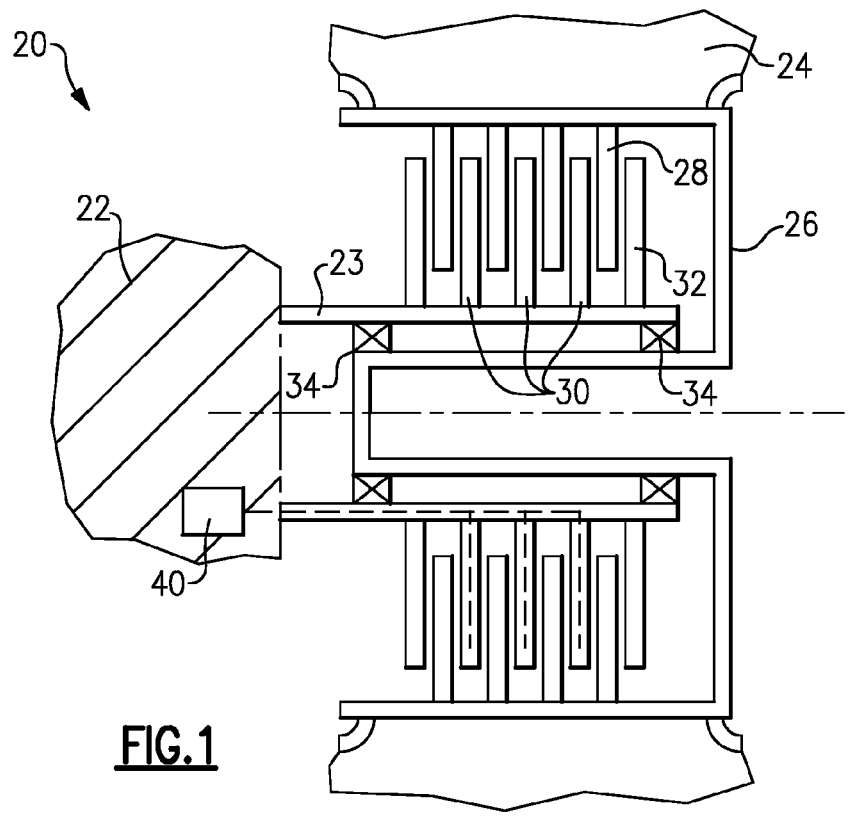
FIG. 1 shows an embodiment of this invention.

As shown in FIG. 1, the elements as mentioned above are incorporated into a system 20. System 20 includes a frame 22 that is fixed to a hub 23. A rotor 26 is positioned relative to the hub 23, and fixed to rotate with a tire 24. Permanent magnet disks 28 are mounted on the rotor 26, and are interspersed with electromagnetic disks 30. As shown, a control system 40 provides the electric power to or collects the electric power from the electromagnetic disks 30. This feature is shown schematically and may be essentially as is described in the above-referenced patents, the description of which is incorporated by reference.

At times, electric systems may fail. If the control system 40 fails to deliver power to or collect electric power from the electromagnetic disks 30, then the function described above will not occur. Thus, in the present invention, disks 32 made of high conductivity metals (Al, Cu), alloys or composite materials are positioned at each end of the array of electromagnetic disks, and adjacent to permanent magnet disks 28 on the rotor 26.

Now, in a failure mode, when the electric contact with the electromagnetic disks 30 has failed, the landing gear is still provided with braking force. The interaction of eddy currents in the high electric conductivity disks 32 induced by rotating permanent magnet disks 28 can still produce substantial braking force, especially at high speed.

Figure 2:
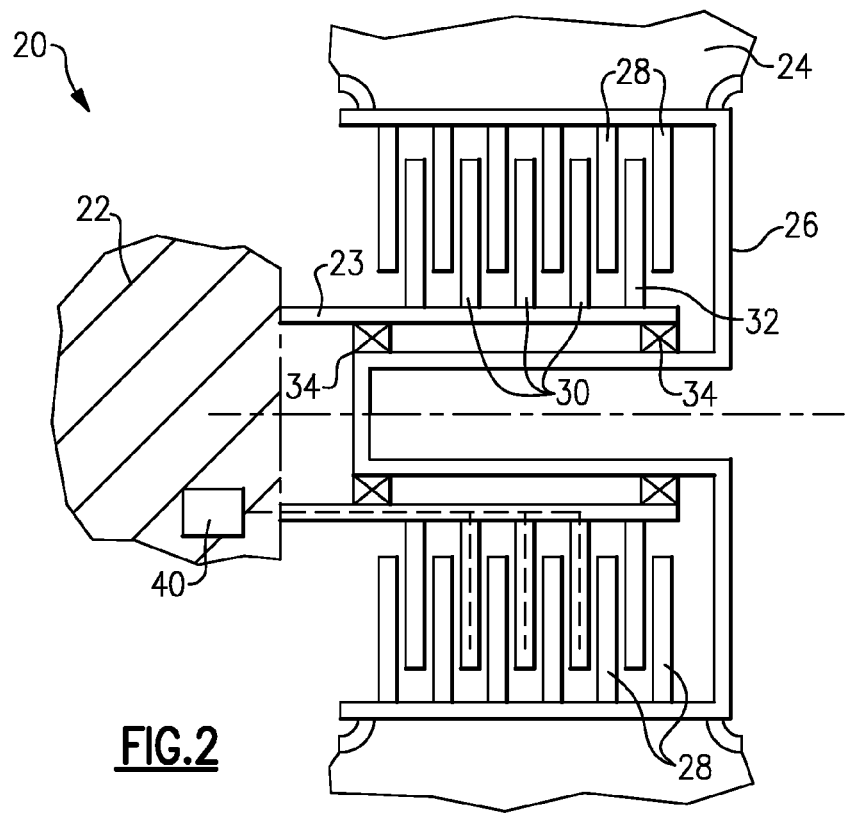
FIG. 2 shows another embodiment of this invention

In FIG. 2 another set of permanent magnet disks 28 has been added at each end of the rotor 26. This configuration will create stronger magnetic field and eddy currents in the high conductivity disks 32 and stronger braking force than in configuration shown in FIG. 1.

In FIG. 2 another set of permanent magnet disks 28 has been added at each end of the rotor 26. This configuration will create stronger magnetic field and eddy currents in the high conductivity disks 32 and stronger braking force than in configuration shown in FIG. 1.

Of course, the number, configuration, material, and sequence of the disks 28, 30 and 32 may be varied and changed according to a particular application. From efficient cooling point of view, the high electric conductivity disks 32 should be the external disks placed at each end of the disk array mounted on the hub 23.

Although embodiments of this invention have been disclosed, a worker of ordinary skill in this art would recognize that certain modifications would come within the scope of this invention. For that reason, the following claims should be studied to determine the true scope and content of this invention.

What is claimed is:
1. An electromagnetic control for the landing gear of an aircraft comprising:
   a hub to be fixed to a frame of an aircraft landing gear;
   a rotor to rotate with a tire in the aircraft landing gear; and
   permanent magnet disks associated with said rotor, and interspersed with a plurality of disks on said hub, some of said plurality of disks on said hub being electromagnetic disks supplied with electric power, and some of said plurality of disks on said hub being made of high electric conductivity materials.
2. The control as set forth in claim 1, wherein a control for said electromagnetic disks is operable to both drive the rotor, and retard rotation of the rotor relative to the hub.

3. The control as set forth in claim 1, wherein said high electric conductivity disks on said hub are positioned at opposed ends of an array of the electromagnetic disks on the hub.

4. The control as set forth in claim 1, wherein permanent magnet disks are positioned at each end of the rotor and beyond outermost ones of the disks on said hub.

5. The control as set forth in claim 1, wherein said high electric conductivity material includes at least one of copper or aluminum, or alloys or composites thereof.

6. A landing gear system for an aircraft comprising:
   a frame mounting a hub;
   a tire mounted on a rotor; and
   permanent magnet disks associated with said rotor, and interspersed with a plurality of disks on said hub, some of said plurality of disks on said hub being electromagnetic disks supplied with electric power, and some of said plurality of disks on said hub being made of high electric conductivity materials.

7. The system as set forth in claim 6, wherein a control for said electromagnetic disks is operable to both drive the rotor, and retard rotation of the rotor relative to the hub.

8. The system as set forth claim 6, wherein said high electric conductivity disks on said hub are positioned at opposed ends of an array of the electromagnetic disks on the hub.

9. The system as set forth in claim 6, wherein permanent magnet disks are positioned at each end of the rotor and beyond outermost ones of the disks on said hub.

10. The system as set forth in claim 6, wherein said high electric conductivity material includes at least one of copper or aluminum, or alloys or composites thereof.

* * * * *